(12) United States Patent
Kaltenbach et al.

(10) Patent No.: US 11,046,391 B2
(45) Date of Patent: Jun. 29, 2021

(54) TRANSMISSION FOR A BICYCLE

(71) Applicant: ZF Friedrichshafen AG, Friedrichshafen (DE)

(72) Inventors: Johannes Kaltenbach, Friedrichshafen (DE); Uwe Griesmeier, Markdorf (DE); Valerie Engel, Markdorf (DE); Matthias Wesa, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 51 days.

(21) Appl. No.: 16/469,957

(22) PCT Filed: Nov. 24, 2017

(86) PCT No.: PCT/EP2017/080397
§ 371 (c)(1),
(2) Date: Jun. 14, 2019

(87) PCT Pub. No.: WO2018/108490
PCT Pub. Date: Jun. 21, 2018

(65) Prior Publication Data
US 2020/0086949 A1      Mar. 19, 2020

(30) Foreign Application Priority Data

Dec. 15, 2016 (DE) ..................... 10 2016 225 142.2

(51) Int. Cl.
*B62M 11/18*   (2006.01)
*B62M 6/55*    (2010.01)
*B62M 11/14*   (2006.01)

(52) U.S. Cl.
CPC .............. *B62M 11/18* (2013.01); *B62M 6/55* (2013.01); *B62M 11/145* (2013.01)

(58) Field of Classification Search
CPC ...... B62M 11/18; B62M 11/145; B62M 6/55; F16H 2200/201
See application file for complete search history.

(56) References Cited

U.S. PATENT DOCUMENTS 6,048,287 A  * 4/2000  Rohloff ................. B62M 11/18
                                                   475/289
6,634,980 B1 * 10/2003 Ziemer .................... F16H 3/66
                                                   475/275

(Continued)

FOREIGN PATENT DOCUMENTS

CN          105134938 A          12/2015
CN          105882883 A           8/2016
(Continued)

OTHER PUBLICATIONS

German Search Report DE102016225142.2, dated Aug. 1, 2017. (12 pages).

(Continued)

*Primary Examiner* — Sherry L Estremsky
(74) *Attorney, Agent, or Firm* — Dority & Manning, P.A.

(57) ABSTRACT

A transmission for a bicycle includes an input shaft (1) which is rotationally fixable to a crankshaft (2), and an output shaft (3) which is rotationally fixable to an output gear. The transmission includes at least three planetary transmissions which are operatively connected to the input shaft and to the output shaft. A single one of the planetary transmissions includes a stepped planetary gear (4) with a first gear teeth section (5) having a first diameter and a second gear teeth section (6) having a second diameter.

18 Claims, 4 Drawing Sheets

(56) References Cited

U.S. PATENT DOCUMENTS

| | | | |
|---|---|---|---|
| 6,644,135 B1* | 11/2003 | Kishimoto | B62M 6/45 |
| | | | 73/862.338 |
| 7,516,677 B2* | 4/2009 | Watarai | G01L 3/102 |
| | | | 73/862.321 |
| 9,279,480 B2* | 3/2016 | Antal | F16H 3/66 |
| 9,796,449 B2 | 10/2017 | Dommsch | |
| 2007/0254767 A1 | 11/2007 | Okochi | |
| 2007/0275811 A1* | 11/2007 | Starik | B62M 11/16 |
| | | | 475/259 |
| 2011/0177911 A1* | 7/2011 | Serkh | F16H 3/663 |
| | | | 475/277 |
| 2011/0241306 A1 | 10/2011 | Serkh et al. | |
| 2013/0345013 A1 | 12/2013 | Antal et al. | |
| 2017/0219066 A1* | 8/2017 | Yamamoto | B62M 6/55 |
| 2020/0086950 A1* | 3/2020 | Griesmeier | F16H 3/66 |

FOREIGN PATENT DOCUMENTS

| | | |
|---|---|---|
| CN | 105882884 A | 8/2016 |
| DE | 19518052 C1 | 11/1996 |
| DE | 19745419 A1 | 4/1998 |
| DE | 102012201373 A1 | 8/2013 |
| DE | 102013206713 A1 | 10/2014 |
| JP | H1030691 A | 2/1998 |
| KR | 20140131433 A | 11/2014 |
| WO | 2012128639 A1 | 9/2012 |
| WO | WO 2014072344 A1 | 5/2014 |

OTHER PUBLICATIONS

International Search Report (English Translation) PCT/EP2017/080397, dated Jan. 30, 2018. (3 pages).

\* cited by examiner

| PG1 | PG2 | PG3 |
|---|---|---|
| -3.68 | -1.62 | -1.62 |

Fig. 4

| Shift Pattern | F1 | B1 | F2 | B2 | F3 | B3 | i | phi |
|---|---|---|---|---|---|---|---|---|
| 1st Gear | X |  | X |  | X |  | 1.00 | 1.27 |
| 2nd Gear |  | X | X |  | X |  | 0.79 | 1.27 |
| 3rd Gear | X |  |  | X | X |  | 0.62 | 1.27 |
| 4th Gear |  | X |  | X | X |  | 0.49 | 1.27 |
| 5th Gear | X |  | X |  |  | X | 0.38 | 1.27 |
| 6th Gear |  | X | X |  |  | X | 0.30 | 1.27 |
| 7th Gear | X |  |  | X |  | X | 0.24 | 1.27 |
| 8th Gear |  | X |  | X |  | X | 0.19 |  |

Fig. 5

TRANSMISSION FOR A BICYCLE

FIELD OF THE INVENTION

The invention relates generally to a transmission or gearbox for a bicycle that includes an input shaft which is rotationally fixable to a crankshaft and an output shaft which is rotationally fixable to an output gear.

The invention also relates generally to a bottom bracket that includes such a transmission and to a bicycle that includes the transmission or the bottom bracket.

BACKGROUND

A plurality of transmissions which are utilized in bicycles and include multiple planetary transmissions is known from the prior art. In particular, it is known to arrange the transmissions in a bottom bracket of the bicycle. The transmissions have the advantage that a plurality of gears can be made available.

The disadvantage of the known transmission, however, is that the design complexity and, therefore, the costs, of the transmission are high.

SUMMARY OF THE INVENTION

Example aspects of the invention provide a transmission which has low design complexity and, simultaneously, makes a high number of gears available.

In example embodiments, a transmission includes an input shaft which is rotationally fixable to a crankshaft and an output shaft which is rotationally fixable to an output gear, and which is characterized in that the transmission includes at least three, e.g., precisely three, planetary transmissions which are operatively connected to the input shaft and to the output shaft. A single one of the planetary transmissions includes a stepped planetary gear that includes a first gear teeth section having a first diameter and a second gear teeth section having a second diameter.

The transmission according to example aspects of the invention has the advantage that the transmission makes a large number of gears available and is designed by providing a single planetary transmission which includes at least one stepped planetary gear, whereby the design complexity and the costs of the transmission are low. In an example embodiment of the transmission, in which the transmission includes precisely three planetary transmissions, at least eight gears can be made available by the transmission for an operation.

In addition, the provision of the stepped planetary gear offers the advantage that a high stationary transmission ratio of the planetary transmission that includes the stepped planetary gear can be achieved without the components of the planetary transmission having a large diameter. If the stepped planetary gear were not provided, the planetary transmission would have a large diameter because the sun gear at least partially encloses the crankshaft and, therefore, has a minimum diameter. Since the diameter of the ring gear depends on the diameter of the sun gear, a large diameter of the sun gear results in a large diameter of the ring gear. In the end, a compact configuration of the transmission can be realized or implemented by providing the stepped planetary gear, and so the installation space needed for the transmission is reduced.

A shaft is not understood exclusively to be a, for example, cylindrical, rotatably mounted machine element for transmitting torques. Rather, shafts are also to be understood to be general connecting elements which connect individual components to one another, in particular connecting elements which connect multiple components to one another in a rotationally fixed manner.

A planetary transmission is understood to be a transmission unit which includes the components: ring gear; carrier; and sun gear. The carrier is utilized for carrying the planet gears of the planetary transmission. In contrast to planet gears which have only one single gear teeth section, a stepped planetary gear has at least two, in particular precisely two, gear teeth sections. The different gear teeth sections have different diameters.

The output gear may be a sprocket or a belt pulley.

In one particular embodiment, the first gear teeth section may be engaged with a sun gear of the planetary transmission. The second gear teeth section, which may have a smaller diameter than the first gear teeth section, may be engaged with a ring gear of the planetary transmission. The sun gear and the ring gear are components of the planetary transmission which includes the stepped planetary gear. The transmission may be designed in such a way that the first gear teeth section is exclusively engaged with the sun gear of the planetary transmission and the second gear teeth section is exclusively engaged with the ring gear of the planetary transmission. Due to a stepped planetary gear designed in such a way, a planetary transmission having a high stationary transmission ratio is made available in a very particularly simple way. The first and the second gear teeth sections are preferably situated adjacent to one another along a central axis of the planet gear.

In the case of planetary transmissions which do not include a stepped planetary gear, the stationary transmission ratio corresponds to the negative ratio of the number of teeth of the ring gear and the sun gear. In the case of planetary transmissions which include a stepped planetary gear, the ratio of the number of teeth of the two gear teeth sections with respect to one another is taken into account in the stationary transmission ratio; in particular, the ratio of the number of teeth is multiplied by the negative ratio of the number of teeth of the ring gear and the sun gear.

With the aid of a planetary transmission, at least two, in particular precisely two, gears can be realized. It is very particularly advantageous when at least two, in particular precisely two, gears can be realized with the aid of each of the planetary transmissions. A first gear may be a direct gear in this case. A direct gear is present when the ratio of the transmission has the value one (1). In the second gear, a speed increasing ratio can be implemented when the ratio of the planetary transmission has a value less than one (1).

In one very particular embodiment, a planetary transmission may include a shift element, with the aid of which two components of the planetary transmission may be connected to one another in a rotationally fixed manner. It is very particularly advantageous when each of the planetary transmissions includes one such shift element. With the aid of the shift element, an interlock of the planetary transmission, i.e., a locking of the speed superposition, can be realized. In this case, there are three interlock variants which can bring about the desired locking effect. Specifically, the shift element may connect the sun gear and the ring gear in a rotationally fixed manner, or may connect the sun gear and the carrier in a rotationally fixed manner, or may connect the ring gear and the carrier in a rotationally fixed manner.

The supporting torques on the shift element and the differential speeds are different in each of the aforementioned interlock variants. An embodiment is very particularly advantageous, in which the shift element is arranged between the sun gear and the ring gear, since the lowest supporting torques occur in this case. A particularly simply designed embodiment may also be realized when the shift element is designed as a free-wheel unit. In this case, the free-wheel unit is a clutch operating in only one direction of rotation and may be designed in such a way that the free-wheel unit interlocks only after an actuation or independently, i.e., without an external actuation.

It is very particularly advantageous when the shift element in the case of the planetary transmission which includes the stepped planetary gear is arranged in such a way that a plane exists, in which the gear teeth section having the smaller diameter and the shift element are arranged. Such an arrangement of the shift element offers the advantage that the planetary transmission can be designed to be short in the axial direction.

The shift element may be arranged, in the radial direction, closer to the crankshaft, which does not belong to the transmission, than the gear teeth section of the stepped planetary gear. As a result, a transmission can be realized, which is compact in the radial direction and in the axial direction. Alternatively, the shift element may be arranged in such a way that the shift element is arranged, in the radial direction, further away from the crankshaft than the gear teeth section having the smaller diameter of the stepped planetary gear. As a result, a transmission can be realized, which is compact in the axial direction.

In one particular embodiment, the planetary transmission may include another shift element, in particular another engageable shift element, with the aid of which a component of the particular planetary transmission may be rotationally fixed to a bottom bracket shell. In particular, each of the planetary transmissions may include another shift element. The component may be the sun gear or the ring gear of the particular planetary transmission.

It is very particularly advantageous when the other shift element is designed as a brake. The brake may be designed to be form-locking or friction-locking, wherein an advantage of a friction-locking design is that, due to the frictional connection, the brakes can be easily engaged even in the case of group shifts, in particular in the case of gear shifts of multiple planetary transmissions simultaneously, such as during a shift from a fifth gear into the fourth gear, and the brakes have a small diameter, and so a smaller installation space in the radial direction is needed for the brakes. In addition, the brake may be designed as an engageable overrunning or freewheel brake, in the case of which braking can be carried out in only one direction of rotation.

In the end, a transmission is provided, in the case of which a first planetary transmission includes a first shift element and a first other shift element, a second planetary transmission includes a second shift element and a second other shift element, and a third planetary transmission includes a third shift element and a third other shift element. With the aid of a transmission designed in this way, eight gears can be realized in a simple way. In particular, the eight gears can be realized in the transmission according to the invention with the aid of, at most, four planet gear planes and, at most, three brakes.

In the first planetary transmission, the input may take place via a carrier and the output may take place via a ring gear of the first planetary transmission. The carrier of the first planetary transmission may carry the stepped planetary gear or the stepped planetary gears. A sun gear of the first planetary transmission may be rotationally fixable to the bottom bracket shell with the aid of the first other shift element. In addition, the sun gear may be rotationally fixable to the carrier with the aid of the first shift element.

In the second planetary transmission, the input may take place via a carrier and the output may take place via a ring gear of the secondary planetary transmission. A sun gear of the second planetary transmission may be rotationally fixable to the bottom bracket shell with the aid of the second other shift element. In addition, the sun gear of the second planetary transmission may be rotationally fixable to the ring gear with the aid of the second shift element.

In the third planetary transmission, the input may take place via a carrier and the output may take place via a sun gear of the third planetary transmission. A ring gear of the third planetary transmission may be rotationally fixable to the bottom bracket shell with the aid of the third other shift element. In addition, the ring gear may be rotationally fixable to the sun gear with the aid of the third shift element.

The arrangement and the interconnection of the three planetary transmissions between the crankshaft and the output gear can take place in highly diverse ways. Specifically, the following arrangement of the three planetary transmissions is possible, as viewed in the direction of the power flow starting from the crankshaft to the output gear:

a) first, second, third planetary transmission; or
   b) first, third, second planetary transmission; or
   c) second, first, third planetary transmission; or
   d) third, first, second planetary transmission; or
   e) second, third, first planetary transmission; or
   f) third, second, first planetary transmission.

In all six arrangement variants, the same transmission ratio range results, i.e., the function of the transmission is the same in all variants. The individual variants differ in terms of the resultant rotational speed and torque ratios at the individual planetary transmissions. Since all planetary transmissions have the direct gear as the first gear, however, the torque load is similar in all variants. Differences result in the case of the speeds since the planetary transmissions positioned further toward the rear in the power flow are operated in some gears with an input speed which is already higher. In the end, in the transmission according to the invention, the arrangement of the planetary transmissions can be flexibly adapted to the actual conditions.

In particular, it is advantageous when at least two, in particular precisely two, planetary transmissions are designed and arranged in such a way that they have the same stationary transmission ratio. For example, the second and the third planetary transmissions may have the same stationary transmission ratio. The provision of at least two planetary transmissions having the same stationary transmission ratio offers the advantage that multiple identically designed parts can be utilized, whereby the costs of the transmission are reduced. The stationary transmission ratio of the second and the third planetary transmissions may be less than the ratio of the first transmission. This offers the advantage that the diameters of the second and the third planetary transmissions are small.

In the end, the transmission may be designed as a group transmission that includes three planetary transmissions, each of which has two gears. The planetary transmission which is directly operatively connected to the input shaft and/or is located at the front as viewed in the direction of the power flow starting from the crankshaft to the output gear may provide a single ratio step and act as a splitter group. The planetary transmission which is located in the center as viewed in the power flow between the crankshaft and the output gear may provide a double ratio step and act as a main group. The planetary transmission which is directly operatively connected to the output shaft and/or is last as viewed in the direction of the power flow starting from the crankshaft to the output gear may provide a four-fold ratio step and act as a range change group. In addition, each of the planetary transmissions may include a shift element in the form of a free-wheel unit and another shift element in the form of a brake.

In one particular embodiment, the transmission may include an electric machine which is operatively connected to one of the planetary transmissions. The electric machine consists at least of a stator and a rotatably mounted rotor and is configured for converting electrical energy into mechanical energy in the form of rotational speed and torque when operated as a motor and for converting mechanical energy into electrical energy in the form of current and voltage when operated as a generator. The rotor of the electric machine may be rotationally fixed to a rotor shaft via a rotationally fixed connection or via a transmission gearing.

The connection of the electric machine to the planetary transmission may take place via a belt drive, such as a toothed belt or a spur gear tooth system. The spur gear tooth system offers the advantage that installation space can be saved in the axial direction of the transmission.

The electric machine may be operatively connected to a gearwheel of the transmission, which may be operatively connected to a ring gear of one of the planetary transmissions. The gearwheel may be engaged with the ring gear of the planetary transmission. Alternatively, it is possible that an intermediate gear is present, which is engaged with the gearwheel and the ring gear of the planetary transmission.

In this case, the gearwheel may be rotationally fixed to the rotor shaft of the electric machine. The electric machine and/or the gearwheel may be arranged, in the radial direction, further from the crankshaft than the ring gear of the planetary transmission. In particular, the gearwheel and the ring gear of the planetary transmission may be arranged in the same other plane. In the end, an electric motor-based assistance of the operation can be realized in a very particularly simple way with the aid of the electric machine, wherein a design which is compact in the axial direction of the transmission can be realized.

In this case, the electric machine may be operatively connected, in particular via the gearwheel, to the planetary transmission which is last as viewed in the direction of the power flow between the crankshaft and the output gear. Since the output in the transmission takes place via the ring gear in the case of the first and the second planetary transmissions, the gearwheel may be engaged with the ring gear of the first or the second planetary transmission since the output takes place via the ring gear in these two planetary transmissions. Therefore, the following arrangement variants of the planetary transmissions are possible when the electric machine is utilized:

a) first, third, second planetary gear set;
b) third, first, second planetary gear set;
c) second, third, first planetary gear set; and
d) third, second, first planetary gear set.

In addition, a free-wheel unit may be arranged, in particular in the power flow, between the electric machine and the planetary transmission operatively connected to the electric machine. Due to the provision of the free-wheel unit, no losses are caused by the concurrently-rotating electric machine for the case in which the electric machine is not operated.

In one particular embodiment of the transmission, the transmission includes a torque sensor. The torque sensor may be operatively connected to the input shaft. The torque sensor may be designed in the shape of a disk or may include a sleeve which encloses the stepped planetary gear. In the latter variant, the torque is measured via the torsion of the sleeve, which is possible because the sleeve is always situated in the power flow. The sleeve is readily accessible to the necessary electronic system, so that a torque measurement can be easily carried out.

A bottom bracket is particularly advantageous, which includes the crankshaft and the bottom bracket shell, wherein the transmission is arranged in a cavity of the bottom bracket shell. In addition, the input shaft is rotationally fixed to the crankshaft. In addition, a bicycle including the bottom bracket or the transmission according to the invention is particularly advantageous.

BRIEF DESCRIPTION OF THE DRAWINGS

Examples aspects of the invention is schematically represented in the figures and is described in the following with reference to the figures, wherein identical or identically operating elements are mostly provided with the same reference characters. Wherein:

FIG. 4 shows a table including the stationary transmission ratios of the three planetary transmissions, and FIG. 5 shows a shift pattern for the transmissions represented in FIGS. 1 to 3.

DETAILED DESCRIPTION

Figure 1:
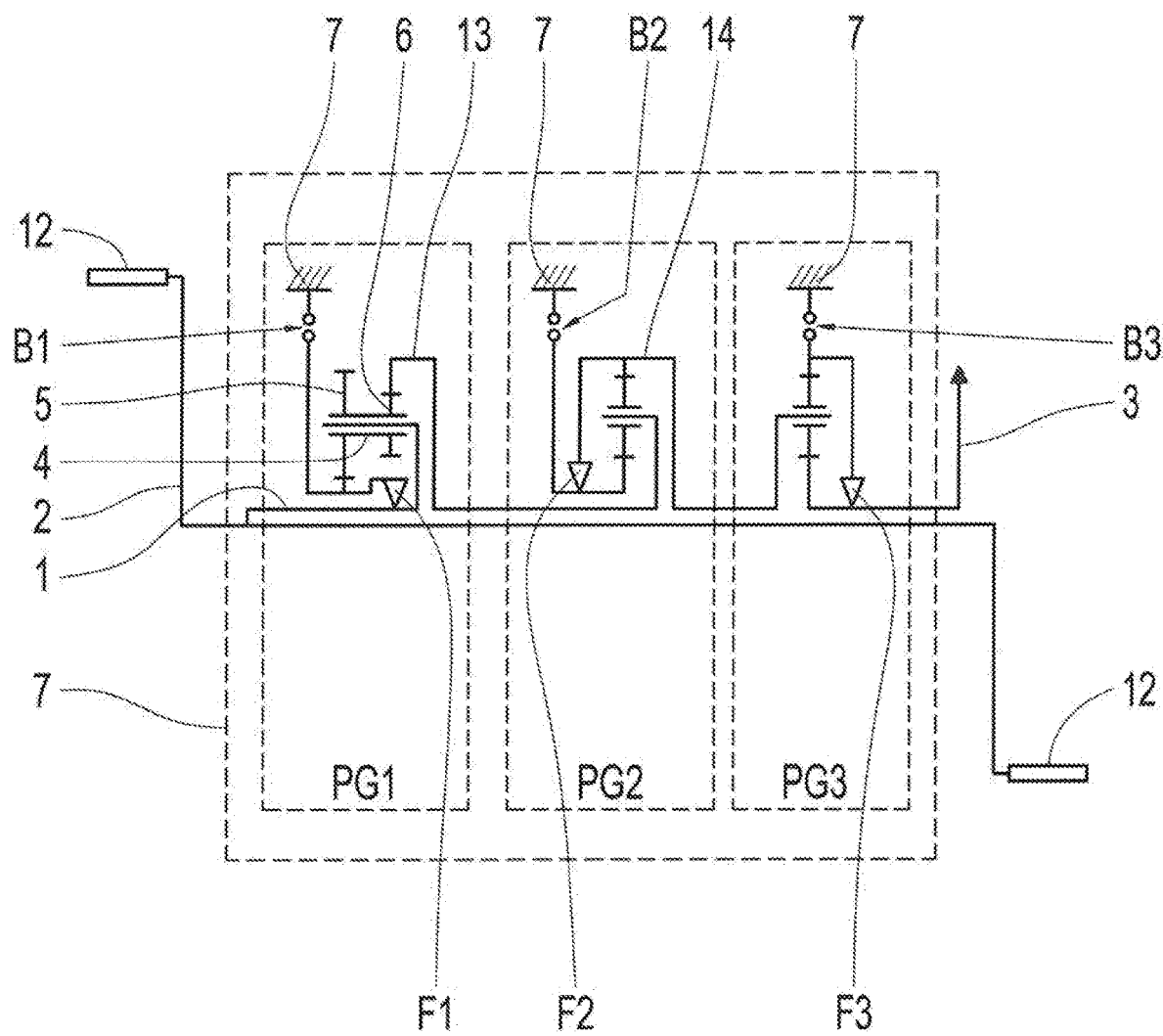
FIG. 1 shows a schematic of a first exemplary embodiment of the transmission according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a first exemplary embodiment of the transmission according to the invention for a bicycle. The transmission is rotationally symmetrical with respect to the axis of a crankshaft 2, wherein only the upper half of the transmission is represented in FIG. 1. In addition, a bottom bracket shell 7 is represented with the aid of dashed lines. The transmission includes an input shaft 1 which is rotationally fixed to the crankshaft 2 which does not belong to the transmission, and an output shaft 3 which is rotationally fixed to an output gear which is not shown in the figures and does not belong to the transmission. The crankshaft 2 includes a pedal 12 at each of end of the crankshaft 2.

In addition, the transmission includes three planetary transmissions which are operatively connected to one another, namely a first planetary transmission PG1, a second planetary transmission PG2, and a third planetary transmission PG3. The planetary transmissions are each directly or indirectly operatively connected to the input shaft 1 and to the output shaft 3. Only one of the three planetary transmissions, namely only the first planetary transmission PG1, includes a stepped planetary gear 4 in this case. The stepped planetary gear 4 includes a first gear teeth section 5 having a first diameter and a second gear teeth section 6 having a second diameter, wherein the second diameter is smaller than the first diameter.

The first gear teeth section 5 is engaged with a sun gear of the first planetary transmission PG1. The second gear teeth section 6 is engaged with a ring gear of the first planetary transmission PG1. In the first planetary transmission, the input takes place via the carrier and the output takes place in the first planetary transmission PG1 via the ring gear. The carrier of the first planetary transmission PG1 carries the stepped planetary gear 4. In addition, the first planetary transmission PG1 includes a first shift element in the form of a first free-wheel unit F1, with the aid of which the sun gear is rotationally fixable to the carrier. The sun gear is rotationally fixable to the bottom bracket shell 7 with the aid of a first other shift element in the form of a first brake B1.

The ring gear of the first planetary transmission PG1 is rotationally fixed to the carrier of the second planetary transmission PG2 with the aid of a first shaft 13. Therefore, the input of the second planetary transmission PG2 takes place via the carrier. A sun gear of the second planetary transmission PG2 is rotationally fixable to the bottom bracket shell 7 with the aid of a second other shift element in the form of a second brake B2. In addition, the second planetary transmission PG2 includes a second other shift element in the form of a second free-wheel unit F2, with the aid of which the sun gear is rotationally fixable to the ring gear of the second planetary transmission PG2. The output of the second planetary transmission PG2 takes place via the ring gear. In particular, the ring gear of the second planetary transmission PG2 is rotationally fixed to a carrier of the third planetary transmission PG3 with the aid of a second shaft 14.

A ring gear of the third planetary transmission PG3 is rotationally fixable to the bottom bracket shell 7 with the aid of a third other shift element in the form of a third brake B3. A sun gear of the third planetary transmission PG3 is rotationally fixed to the output shaft 3. In addition, the sun gear is rotationally fixable to the ring gear of the third planetary transmission PG3 with the aid of a third shift element in the form of a third free-wheel unit F3.

The three planetary transmissions are arranged in the following sequence as viewed in the direction of power flow between the crankshaft 2 and the output gear: first planetary transmission PG1; second planetary transmission PG2; and third planetary transmission PG3. The three planetary transmissions are arranged coaxially to one another. In addition, the three planetary transmissions are arranged coaxially to the crankshaft 2.

Figure 2:
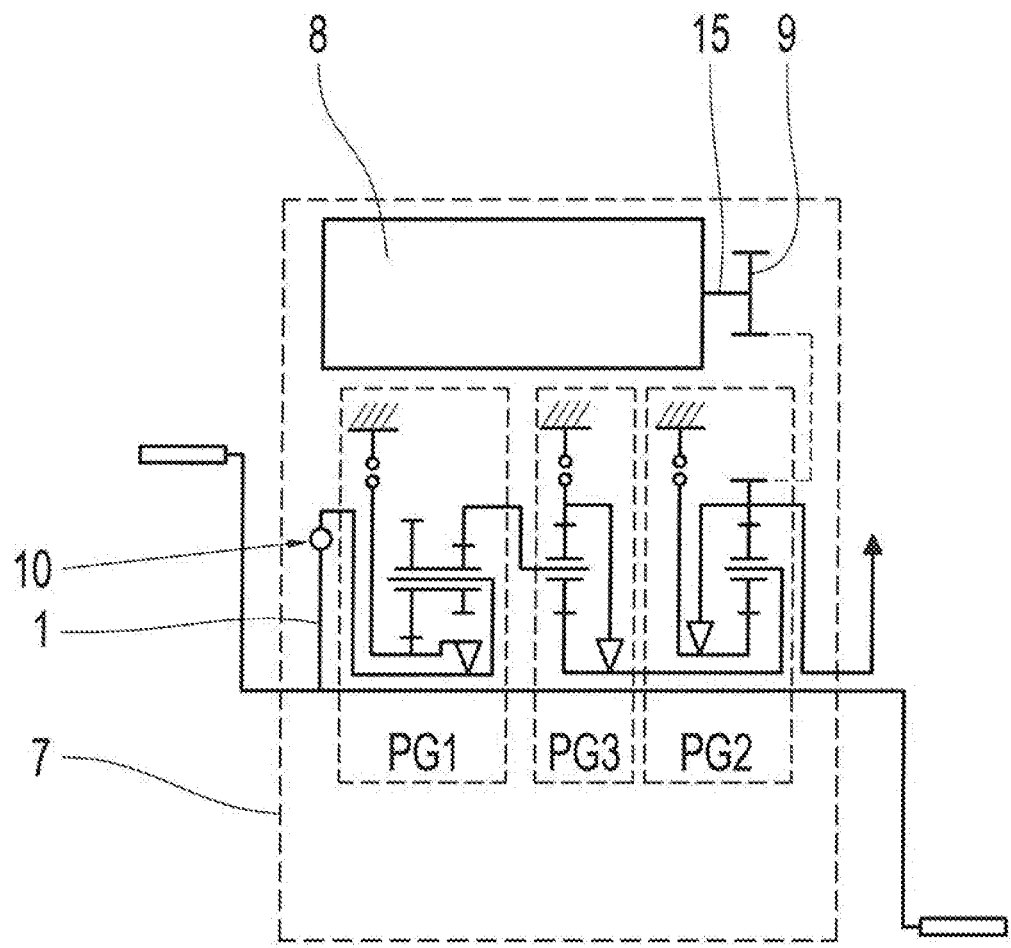
FIG. 2 shows a schematic of a second exemplary embodiment of the transmission according to the invention.

FIG. 2 shows a second exemplary embodiment of the transmission according to the invention. The second exemplary embodiment differs from the first exemplary embodiment shown in FIG. 1 in terms of the arrangement of the three planetary transmissions PG1, PG2, PG3. The three planetary transmissions are arranged in the following sequence as viewed in the direction of power flow starting from the crankshaft 2 to the output gear: first planetary transmission PG1, third planetary transmission PG3, second planetary transmission PG2.

One further difference is that an electric machine 8 is present in the transmission, which is operatively connected to the second planetary transmission PG2. A rotor shaft 15 of the electric machine is rotationally fixed to a gearwheel 9 of the transmission, wherein the gearwheel 9 is operatively connected to a ring gear of the second planetary transmission, as represented by the dashed line. The gearwheel 9 may be engaged with the ring gear of the second planetary transmission PG2 or may be engaged with another intermediate gear (not represented) which is engaged with the ring gear of the second planetary transmission PG2.

In addition, there is a difference in that a disk-shaped torque sensor 10 is present in the second exemplary embodiment represented in FIG. 2. The disk-shaped torque sensor 10 is operatively connected to the input shaft 1 and is utilized for measuring the torque applied to the input shaft 1.

The transmission including the transmission components, such as planetary transmission, electric machine, torque sensors, etc., is arranged within a cavity of the bottom bracket shell 7. The transmission may be modularly designed, and so the transmission is introduced in its entirety into the bottom bracket shell.

Figure 3:
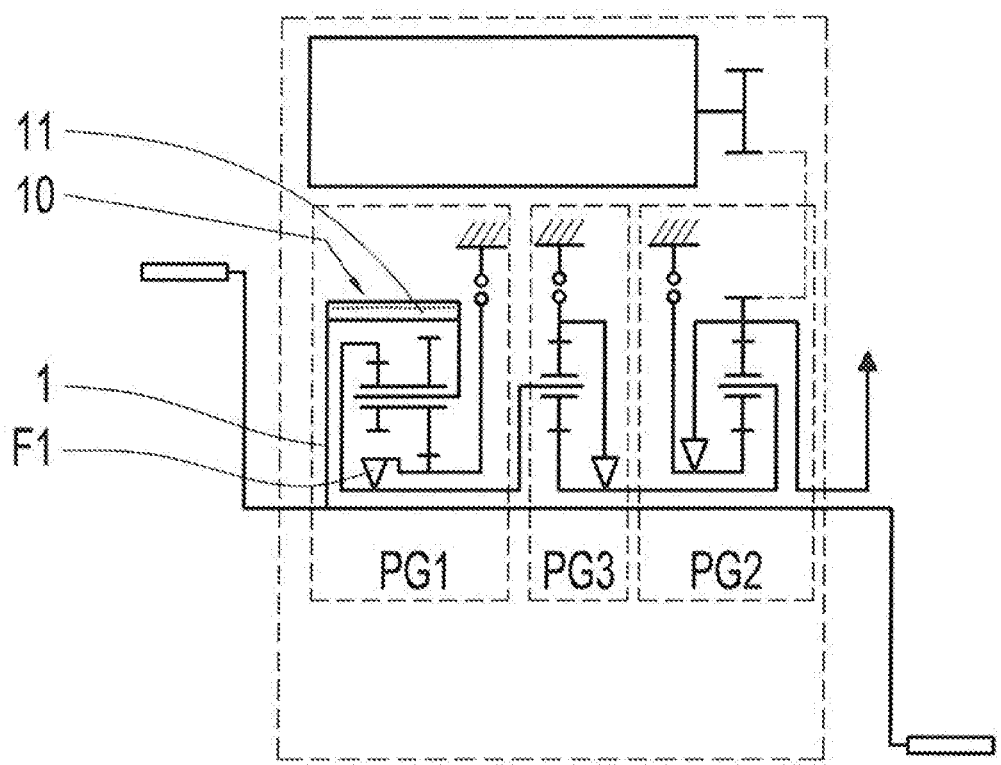
FIG. 3 shows a schematic of a third exemplary embodiment of the transmission according to the invention.

FIG. 3 shows a third exemplary embodiment of the transmission according to the invention. The third exemplary embodiment differs from the second exemplary embodiment represented in FIG. 2 in terms of the design of the first planetary transmission PG1. The stepped planetary gear 4 represented in FIG. 3 is a mirror image of the stepped planetary gear represented in FIG. 1. One further difference is that a rotationally fixed connection may be realized between the sun gear and the ring gear of the first planetary transmission PG1 with the aid of the first free-wheel unit F1.

There is also a difference in terms of the design of the torque sensor 10. In the embodiment represented in FIG. 3, the torque sensor 10 is designed as a sleeve 11 which is operatively connected to the input shaft 1 and to the carrier of the first planetary transmission PG1.

FIG. 4 shows the values for the stationary transmission ratio for the three planetary transmissions PG1, PG2, PG3. As is apparent from the table, the second planetary transmission PG2 and the third planetary transmission PG3 have the same stationary transmission ratio. The stationary transmission ratio of the first planetary transmission PG1 is greater than the stationary transmission ratio of the second planetary transmission PG2 and the third planetary transmission PG3.

FIG. 5 shows the shift pattern for the transmissions represented in FIGS. 1 through 3. In addition, the shift pattern contains a few exemplary values for the transmission ratios "i" as well as the associated ratio steps "phi". An "X" for a free-wheel unit means that the free-wheel unit interlocks. This may take place independently, i.e., without external actuation, or as a result of an external actuation, for example, with the aid of an actuating element. An "X" for a brake means the particular brake is engaged. An engagement of the brake may be realized with the aid of a suitable actuator system.

Modifications and variations can be made to the embodiments illustrated or described herein without departing from the scope and spirit of the invention as set forth in the appended claims.

REFERENCE CHARACTERS 1 input shaft
2 crankshaft
3 output shaft
4 stepped planetary gear
5 first gear teeth section
6 second gear teeth section
7 bottom bracket shell
8 electric machine
9 gearwheel
10 torque sensor
11 sleeve 12 pedal
13 first shaft
14 second shaft
15 rotor shaft
B1 first brake
B2 second brake
B3 third brake
F1 first free-wheel unit
F2 second free-wheel unit
F3 third free-wheel unit
PG1 first planetary transmission
PG2 second planetary transmission
PG3 third planetary transmission

The invention claimed is:

1. A transmission for a bicycle, comprising:
an input shaft (1) which is rotationally fixable to a crankshaft (2);
an output shaft (3) which is rotationally fixable to an output gear; and
three planetary transmissions which are operatively connected to the input shaft and to the output shaft,
wherein a single one of the three planetary transmissions comprises a stepped planetary gear (4) that includes a first gear teeth section (5) having a first diameter and a second gear teeth section (6) having a second diameter, and
wherein each of the three planetary transmissions comprises a shift element with the aid of which two components of each planetary transmission are connectable to each other in a rotationally fixed manner.

2. The transmission of claim 1, wherein:
the first gear teeth section (5) is engaged with a sun gear of the single one of the three planetary transmissions;
the second gear teeth section (6) is engaged with a ring gear of the single one of the three planetary transmissions; or
the first gear teeth section (5) is engaged with the sun gear of the single one of the three planetary transmissions, and the second gear teeth section (6) is engaged with the ring gear of the single one of the three planetary transmissions.

3. The transmission of claim 1, wherein two gears are implementable with each of the three planetary transmissions.

4. The transmission of claim 3, wherein, in each of the three planetary transmissions, a first gear of the two gears is a direct gear and a second gear of the two gears implements a speed increasing ratio.

5. The transmission of claim 1, wherein each of the three planetary transmissions comprises another shift element with the aid of which a component of each planetary transmission us rotationally fixable to a bottom bracket shell (7).

6. The transmission of claim 1, wherein:
in a first planetary transmission (PG1) of the three planetary transmissions, an input takes place via a carrier of the first planetary transmission (PG1) and an output takes place via a ring gear of the first planetary transmission (PG1);
in a second planetary transmission (PG2) of the three planetary transmissions, an input takes place via a carrier of the second planetary transmission (PG2) and an output takes place via a ring gear of the second planetary transmission (PG2); and
in a third planetary transmission (PG3) of the three planetary transmissions, an input takes place via a carrier of the third planetary transmission (PG3) and an output takes place via a sun gear of the third planetary transmission (PG3).

7. The transmission of claim 6, wherein:
a sun gear of the first planetary transmission (PG1) is rotationally fixable to the carrier of the first planetary transmission (PG1) with the aid of a first shift element, and the sun gear of the first planetary gear set (PG1) is rotationally fixable to a bottom bracket shell (7) with the aid of a first additional shift element;
a sun gear of the second planetary gear set (PG2) is rotationally fixable to the ring gear of the second planetary gear set (PG2) with the aid of a second shift element, and the sun gear of the second planetary gear set (PG2) is rotationally fixable to the bottom bracket shell (7) with the aid of a second additional shift element; and
a ring gear of the third planetary gear set (PG3) is rotationally fixable to the sun gear of the third planetary gear set (PG3) with the aid of a third shift element, and the ring gear of the third planetary gear set (PG3) is rotationally fixable to the bottom bracket shell (7) with the aid of a third additional shift element.

8. The transmission of claim 1, wherein two of the three planetary transmissions are designed and arranged in such a way that the two of the three planetary transmissions have an identical stationary transmission ratio.

9. The transmission of claim 1, further comprising an electric machine (8) operatively connected to a planetary transmission of the three planetary transmissions.

10. The transmission of claim 9, wherein:
the electric machine (8) is operatively connected to a gearwheel (9) of the transmission that is operatively connected to a ring gear of one of the three planetary transmissions, or the electric machine (8) is operatively connected to the planetary transmission of three planetary transmissions which is last as viewed in a direction of power flow between the crankshaft (2) and the output gear; and
a free-wheel unit is arranged between the electric machine (8) and the planetary transmission operatively connected to the electric machine (8).

11. The transmission of claim 1, further comprising a torque sensor (10) that is rotationally fixed to the input shaft (1).

12. The transmission of claim 11, wherein:
the torque sensor (10) is a sleeve (11) that encloses the stepped planetary gear (4), or
the torque sensor (10) is disk-shaped.

13. A bottom bracket for a bicycle, comprising the transmission of claim 1, the crankshaft (2) and a bottom bracket shell (7), wherein the transmission is arranged in a cavity of the bottom bracket shell (7) and the input shaft (1) is rotationally fixed to the crankshaft (2).

14. A bicycle, comprising the bottom bracket of claim 13.

15. A bicycle, comprising the transmission of claim 1.

16. A transmission for a bicycle, comprising:
an input shaft (1) which is rotationally fixable to a crankshaft (2);
an output shaft (3) which is rotationally fixable to an output gear; and
three planetary transmissions which are operatively connected to the input shaft and to the output shaft,
wherein a single one of the three planetary transmissions comprises a stepped planetary gear (4) that includes a first gear teeth section (5) having a first diameter and a second gear teeth section (6) having a second diameter, wherein two gears are implementable with each of the three planetary transmissions, and wherein, in each of the three planetary transmissions, a first gear of the two gears is a direct gear and a second gear of the two gears implements a speed increasing ratio.

17. A transmission for a bicycle, comprising:

an input shaft (1) which is rotationally fixable to a crankshaft (2);

an output shaft (3) which is rotationally fixable to an output gear; and three planetary transmissions which are operatively connected to the input shaft and to the output shaft, wherein a single one of the three planetary transmissions comprises a stepped planetary gear (4) that includes a first gear teeth section (5) having a first diameter and a second gear teeth section (6) having a second diameter, wherein in a first planetary transmission (PG1) of the three planetary transmissions, an input takes place via a carrier of the first planetary transmission (PG1) and an output takes place via a ring gear of the first planetary transmission (PG1), wherein in a second planetary transmission (PG2) of the three planetary transmissions, an input takes place via a carrier of the second planetary transmission (PG2) and an output takes place via a ring gear of the second planetary transmission (PG2), and wherein in a third planetary transmission (PG3) of the three planetary transmissions, an input takes place via a carrier of the third planetary transmission (PG3) and an output takes place via a sun gear of the third planetary transmission (PG3).

18. A transmission for a bicycle, comprising:

an input shaft (1) which is rotationally fixable to a crankshaft (2);

an output shaft (3) which is rotationally fixable to an output gear;

three planetary transmissions which are operatively connected to the input shaft and to the output shaft;

an electric machine (8) operatively connected to a planetary transmission of the three planetary transmissions; and a free-wheel unit arranged between the electric machine (8) and the planetary transmission operatively connected to the electric machine (8), wherein a single one of the three planetary transmissions comprises a stepped planetary gear (4) that includes a first gear teeth section (5) having a first diameter and a second gear teeth section (6) having a second diameter, and wherein the electric machine (8) is operatively connected to a gearwheel (9) of the transmission that is operatively connected to a ring gear of one of the three planetary transmissions, or the electric machine (8) is operatively connected to the planetary transmission of three planetary transmissions which is last as viewed in a direction of power flow between the crankshaft (2) and the output gear.

* * * * *